(12) United States Patent
Caulle et al.

(10) Patent No.: US 12,463,586 B2
(45) Date of Patent: Nov. 4, 2025

(54) SOLAR PANEL FRAME DISASSEMBLING APPARATUS

(71) Applicant: MONDRAGON ASSEMBLY, S.COOP., Aretxabaleta (ES)

(72) Inventors: Oliver Caulle, Bourg Saint Andeol (FR); Florian Valentin, Rochegude (FR); Rui De Almeida, Orange (FR); Aitor Apraiz Arenaza, Aretxabaleta (ES); Jean-Philippe Aguerre, Aretxabaleta (ES)

(73) Assignee: MONDRAGON ASSEMBLY, S.COOP., Aretxabaleta (ES)

( * ) Notice: Subject to any disclaimer, the term of this patent is extended or adjusted under 35 U.S.C. 154(b) by 0 days.

(21) Appl. No.: 18/890,280

(22) Filed: Sep. 19, 2024

(65) Prior Publication Data

US 2025/0096727 A1 Mar. 20, 2025

(30) Foreign Application Priority Data

Sep. 19, 2023 (EP) ..................................... 23382945

(51) Int. Cl.
*B23P 19/02* (2006.01)
*B25B 27/00* (2006.01)
(Continued)

(52) U.S. Cl.
CPC ............ *H02S 40/00* (2013.01); *B23P 19/025* (2013.01); *B25B 27/00* (2013.01); *H02S 30/10* (2014.12);
(Continued)

(58) Field of Classification Search
CPC ............... B23B 43/006; B23B 2457/12; Y10S 156/924; Y10S 156/937; Y10S 156/1184; B23P 19/02; B23P 19/025; H02S 30/10; Y10T 29/49821; Y10T 29/49822; Y10T 29/53683; Y10T 29/49751; Y10T 29/49755; B32B 43/006; B32B 2457/12
See application file for complete search history.

(56) References Cited

U.S. PATENT DOCUMENTS 6,430,793 B1 * 8/2002 Pedersoli .............. B23P 19/025
29/239
11,065,859 B2 7/2021 Lee et al.
(Continued)

FOREIGN PATENT DOCUMENTS

AU 2021106180 A4 10/2021
CN 108461573 A * 8/2018
(Continued)

OTHER PUBLICATIONS

European Search Report, EP23382945, Mar. 1, 2024, 47 pages.

*Primary Examiner* — Jermie E Cozart
(74) *Attorney, Agent, or Firm* — Edell, Shapiro & Finnan, LLC (57) ABSTRACT

Disclosed is an apparatus that is configured to separate the frame of a solar panel from the body of the solar panel. The apparatus includes first and second plates that are configured to clamp the body between them. Separating at least a portion of the frame from the body is achieved through the use of one or more separation elements that are collectively configured and arranged to progressively push on a side of the frame.

13 Claims, 7 Drawing Sheets

(51) Int. Cl.
*H02S 30/10* (2014.01)
*H02S 40/00* (2014.01)
*B32B 43/00* (2006.01)

(52) U.S. Cl.
CPC ............ *B23P 19/02* (2013.01); *B32B 43/006* (2013.01); *B32B 2457/12* (2013.01); *Y10S 156/924* (2013.01); *Y10S 156/937* (2013.01); *Y10T 29/49751* (2015.01); *Y10T 29/49755* (2015.01); *Y10T 29/49821* (2015.01); *Y10T 29/49822* (2015.01); *Y10T 29/53683* (2015.01); *Y10T 156/1184* (2015.01)

(56) References Cited

U.S. PATENT DOCUMENTS

| | | | |
|---|---|---|---|
| 11,491,775 B1 | 11/2022 | Lee et al. | |
| 2003/0188418 A1* | 10/2003 | Mlinar | H01M 8/1004 |
| | | | 29/722 |
| 2014/0170923 A1* | 6/2014 | Sanglier | H05B 33/10 |
| | | | 445/2 |
| 2018/0093466 A1* | 4/2018 | Park | B32B 43/006 |

FOREIGN PATENT DOCUMENTS

| | | | | |
|---|---|---|---|---|
| CN | 115213196 A | * | 10/2022 | |
| CN | 115625180 A | | 1/2023 | |
| JP | 09263500 A | * | 10/1997 | ............ B26D 3/282 |
| JP | 2022158085 A | | 10/2022 | |
| KR | 102364969 B1 | | 2/2022 | |

\* cited by examiner

SOLAR PANEL FRAME DISASSEMBLING APPARATUS

CROSS-REFERENCE TO RELATED APPLICATIONS

This application claims the benefit and priority to European Application No. EP23382945.6, filed Sep. 19, 2023, which is incorporated by reference herein in its entirety.

TECHNICAL FIELD

The present invention relates to apparatuses for disassembling the frame of a solar panel comprising a body surrounded by the frame.

BACKGROUND

A solar panel comprises a main body comprising the solar cells and their connections, a glass on the side of the cells that are exposed to the sun and a plastic under the other side. Thus, the solar cells and their connections are protected on both sides. The solar panel further comprises a power module attached or bonded to the plastic, and a frame that surrounds the body and keeps it protected. The frame protrudes vertically at least from the plastic, so that the power module is also protected by the frame, the frame being usually made of metal, e.g. aluminium. A conventional solar panel comprises four sides, with the frame comprising four sides.

Once the useful life of these modules is over, for environmental reasons it is preferable to be able to recycle or reuse the different parts that make them up. It is therefore important to be able to separate the different parts of the body from each other (at least the glass and plastic), and safely without breaking them, and apparatuses adapted to be able to manipulate the body and separate these elements are known.

But before these apparatuses can manipulate the body, it is necessary to separate it from the frame. That is to say, it is necessary to separate the frame from the body, in order to be able to manipulate the body on one side and the frame on the other side.

Frames are usually attached by glue or silicone to the body, for example, and to separate it from the body, apparatuses are known which exert a force on the frame in the opposite direction to the body, thus separating it from the body when the force they exert exceeds the force provided by the glue or silicone. Some of these apparatuses have an element that holds the frame and pulls it away from the body, preferably comprising at least one such element for each side of the frame.

U.S. Pat. No. 11,491,775 B1 discloses an apparatus in which the body of the solar panel is clamped between two plates, and with the solar panel thus clamped, a separation element is moved underneath the plastic of the solar panel and the frame is pushed on the protruding side of the body. The separating element moves between a first position inside the frame and a second position outside the frame in such a way that during this movement it pushes the corresponding side of the frame away from the rest of the solar panel body.

SUMMARY

Disclosed is an apparatus for disassembling solar panel frames.

A solar panel comprises a body surrounded by a frame. A conventional panel is rectangular, with the frame comprising four sides.

The proposed apparatus is configured to separate the frame from the body and comprises a positioning plate and a contact plate configured to clamp the body of a solar panel between said plates; and a separation assembly that is below or above the body and facing the frame when the body is clamped. The separation assembly is movable between a first position inside the frame and a second position outside the frame, such that the separation assembly pushes against the frame during such displacement.

The separation assembly is configured to progressively contact the frame as it moves from the first position to the second position. This progressive contact leads to a progressive separation of the frame from the solar panel body, aided by the separation assembly, resulting in a less aggressive separation than in the prior art. Therefore, the proposed apparatus reduces the risk of breaking any element of the solar panel during this separation, especially the most sensitive ones, including the glass covering the body (if any).

In addition, as the frame is pushed progressively, the force required to cause the separation is lower, which reduces the risk of breaking any element of the solar panel and at least leads to energy savings.

These and other advantages and features will become apparent in view of the figures and the detailed description.

DETAILED DISCLOSURE OF THE INVENTION

Figure 1:
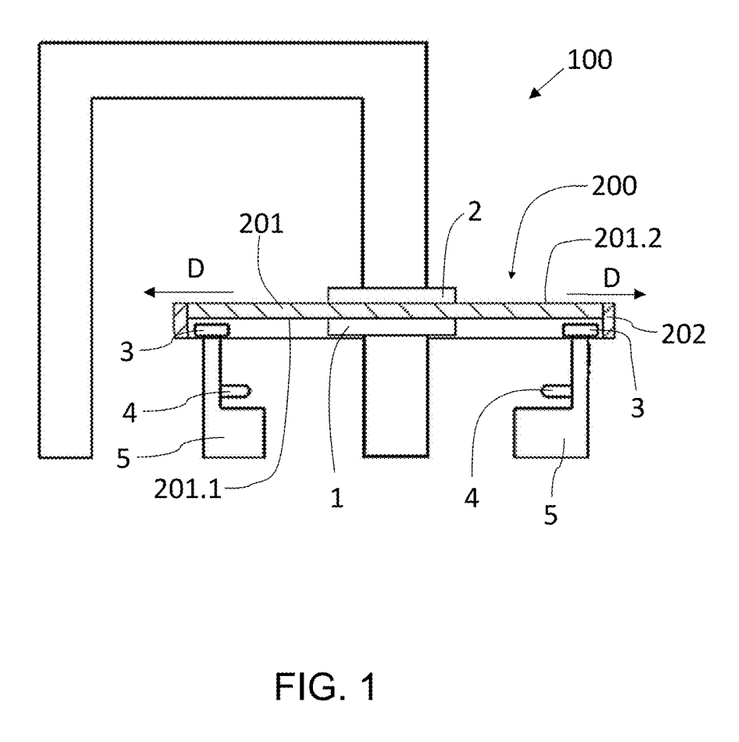
FIG. 1 shows an embodiment of an apparatus with a solar panel clamped between a positioning plate and a contact plate of the apparatus and with separation assemblies of said apparatus in a first position.
Figure 2:
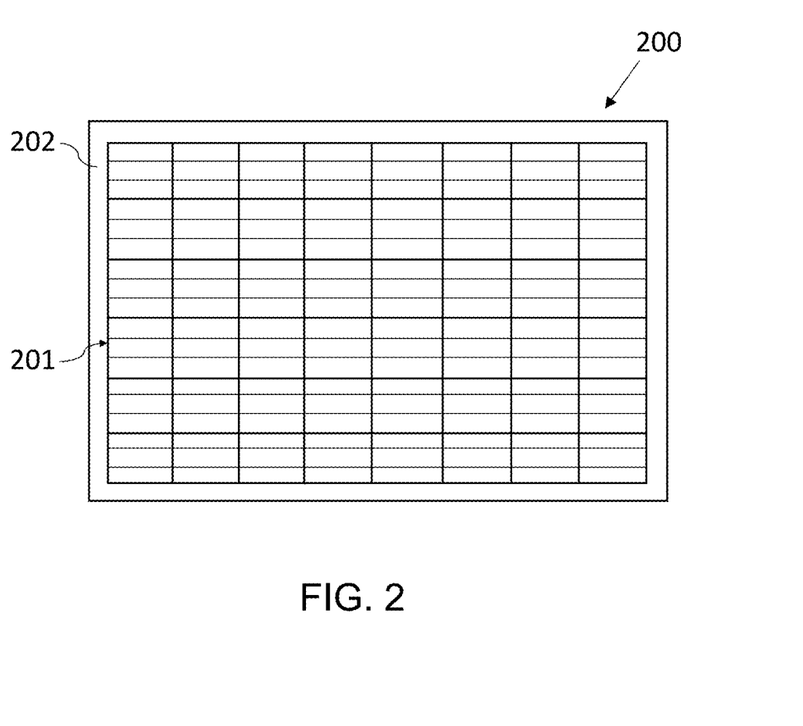
FIG. 2 shows a plan view of a conventional solar panel.
Figure 3:
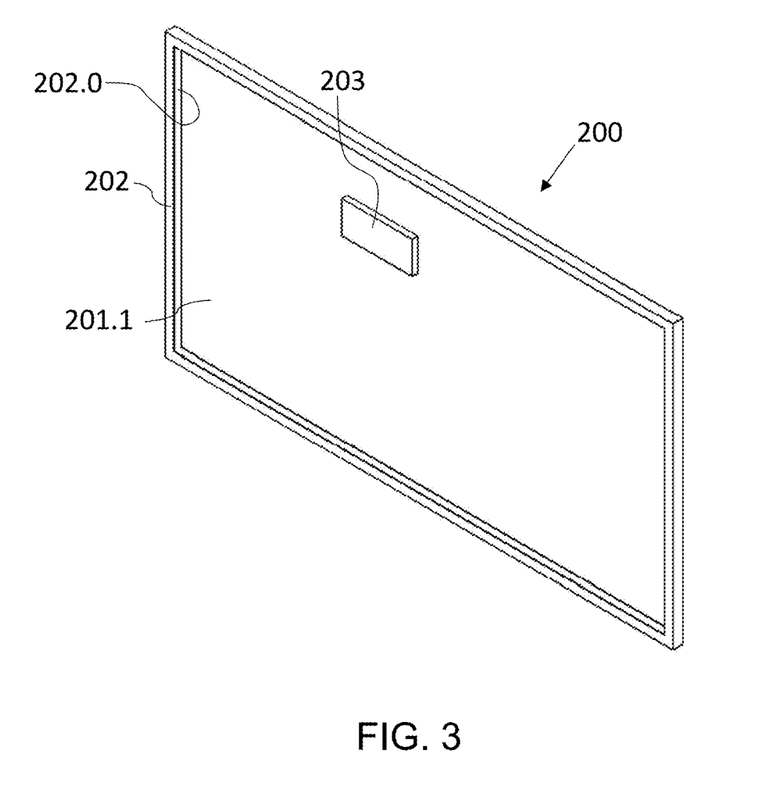
FIG. 3 shows in perspective a bottom view of the solar panel of FIG. 2.

FIG. 1 shows an embodiment of the proposed apparatus 100, which is adapted for disassembling frames from solar panel frames comprising a body 201 surrounded by a frame 202, as depicted in FIGS. 2 and 3. For clarity the solar panel 200 is shown in section in FIG. 1.

The body 201 of a solar panel 200 comprises, in general, a plurality of solar cells electrically connected through conductive wires or cables, a plastic covering one side of said solar cells and a glass covering the other side of said solar cells (the side exposed to the sun's rays). Hereinafter the side which is not exposed to the sun, and which is normally covered with a plastic, is referred to as a first outer surface 201.1 of the body 201, and the side which is exposed to the sun, which is normally covered with a glass, is referred to as a second outer surface 201.2 of the body 201 in the context of the invention, and both outer surfaces 201.1 and 202.2 are preferably parallel. A conventional solar panel 200 comprises a rectangular shape (see FIGS. 2 and 3), the frame 202 comprising four sides.

A solar panel 200 further comprises a power module 203 attached or bonded to the first outer surface 201.1, and in order to have this power module 203 protected, the frame 202 protrudes vertically from the body 201 (at least from the first outer surface 201.1) as depicted in FIG. 3. Thus, the frame 202 comprises an internal surface 202.0 on said protruding part of the body 201 (of the first outer surface 201.1 in this case), which delimits a contour within the frame 202.

The apparatus 100 is configured to separate the frame 202 from the body 201. Said apparatus 100 comprises a positioning plate 1 and a contact plate 2 configured to clamp the body 201 of a solar panel 200 arranged between said plates 1 and 2. Preferably, the first outer surface 201.1 of the solar panel 200 rests on the positioning plate 1, and the contact plate 2, which is facing the positioning plate 1, is displaced towards said positioning plate 1 to clamp the body 201 of the solar panel 200. Thus, said body 201, and thus the solar panel 200, is clamped between both plates 1 and 2. The positioning plate 1 could be configured to move up and down to facilitate the task of a user (in some of those cases the contact plate 2 can remain static then).

The apparatus 100 further comprises a separation assembly 3 configured to be arranged on said body 201 or under said body 201 (in particular on or under the first outer surface 201.1) and facing the frame 202 (in particular the inner surface 202.0) at least when the body 201 is clamped between the two plates 1 and 2. The separation assembly 3 is displaceable between a first position inside the frame 202 (see FIG. 4) and a second position outside said frame 202 (see FIG. 6), in a displacement direction D, such that the separation assembly 3 pushes said frame 202 during said displacement separating it from the body 201. Said displacement is preferably parallel to the first outer surface 201.1. In the context of the invention, when it is indicated "outside the frame 202" it is to be interpreted as meaning that it would protrude from the frame 202 in case of not pushing the frame 202 (out of the contour delimited by the frame 202), as represented for clarity in FIG. 5, but in use this will not be the case because the separation assembly 3 pushes the frame 202 during said displacement (see FIG. 6).

The separation assembly 3 is configured to progressively contact the frame 202 during its movement from the first position to the second position. This allows the frame 202 to be separated from the body 201 in a progressive manner, which implies a more controlled and safe separation and a breakage of the frame 202 and, above all, of the body 201 (or of some element of the body 201) is avoided to a greater extent. As there is a progressive contact and a progressive separation is generated, the force required to separate the frame 202 from the body 201 is lower, resulting in a lower risk of breaking the frame 202 and the body 201.

The separation assembly 3 comprises a main separation element 3.0 with a contact surface facing the frame 202 (on one side of the frame 202) when the separation assembly 3 is in the first position and at least when the body 201 of the solar panel 200 is clamped between the two plates 1 and 2. The contact surface is configured to contact said frame 202 during the displacement of the separation assembly 3 from the first position to the second position and comprises a profile non-parallel to said side of the frame 202, such that it progressively contacts said frame 202 during the displacement of the separation assembly 3 from the first position to the second position.

Preferably the profile of the contact surface of the main separation element 3.0 is symmetrical with respect to a central point of said contact surface, said contact surface may comprise a V-shape (as depicted in the figures) or a semi-circular shape, for example. Said central point is the point of said contact surface of the main separation element 3.0 closest to the frame 202 with the body 201 clamped between the plates 1 and 2 and the separation assembly 3 in the first position.

In some embodiments, the separation assembly 3 comprises at least one additional separation element 3.1 at one side of the main separation element 3.0 and spaced from said main separation element 3.0, preferably at least one additional separation element 3.1 at each side. The additional separation element 3.1 is configured to contact the frame 202, and push said frame 202, during displacement of the separation assembly 3 between the first position within the frame 202 and the second position.

Preferably the additional separation element 3.1 is further away from the frame 202 than the main separation element 3.0 when the separation assembly 3 is in the first position, and all separation elements 3.0 and 3.1 of the separation assembly 3 are configured to move simultaneously during displacement of said separation assembly 3 from the first position to the second position. The apparatus 100 comprises an actuator 4 configured to cause the joint displacement of all the separation elements 3.0 and 3.1 of the separation assembly 3 during the displacement of said separation assembly 3 between the first position and the second position, although it could comprise a specific actuator for each separation element 3.0 and 3.1.

In embodiments in which the apparatus 100 comprises an actuator 4 for simultaneously displacing all of the separation elements 3.0 and 3.1 of a separation assembly 3, said apparatus 100 preferably comprises a support 5 to which all of the separation elements 3.0 and 3.1 are attached, and the actuator 4 is configured to cause displacement of said support 5 to cause displacement of the separation assembly 3 between the first position and the second position.

Figure 4:
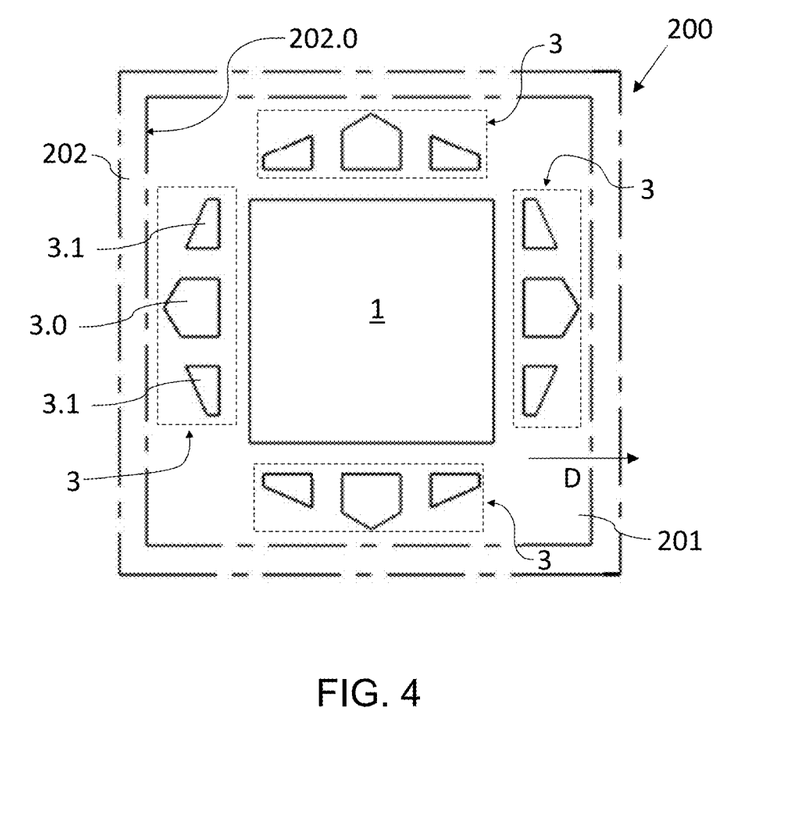
FIG. 4 shows a schematic and plan view of some separation assemblies of the apparatus of FIG. 1 in a first position, where a solar panel is shown in broken lines.
Figure 5:
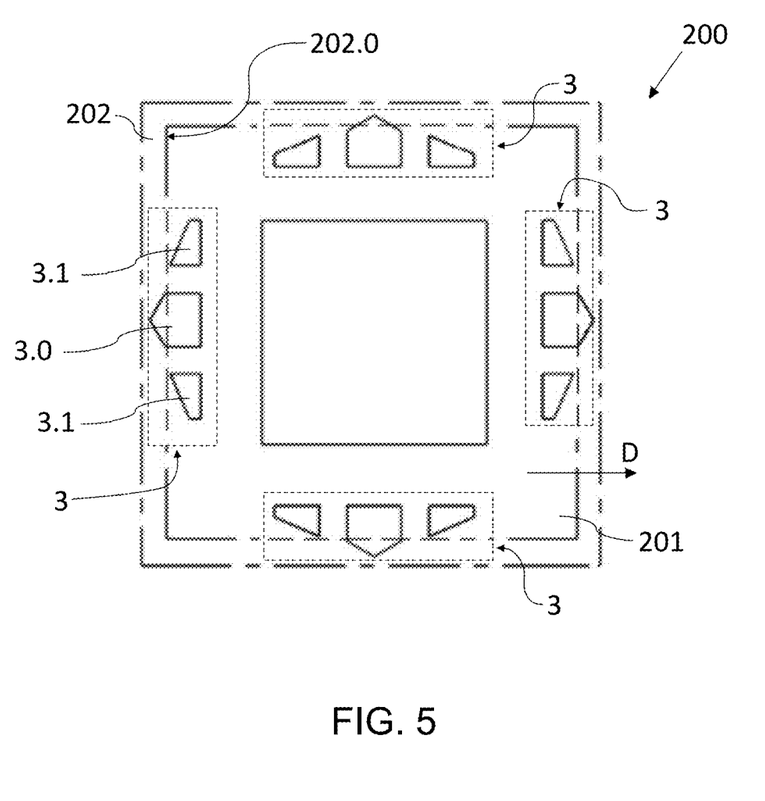
FIG. 5 shows a schematic and plan view of the separation assemblies of the apparatus of FIG. 1 during its displacement from the first position to a second position, where a solar panel is depicted with dashed lines as a reference.
Figure 6:
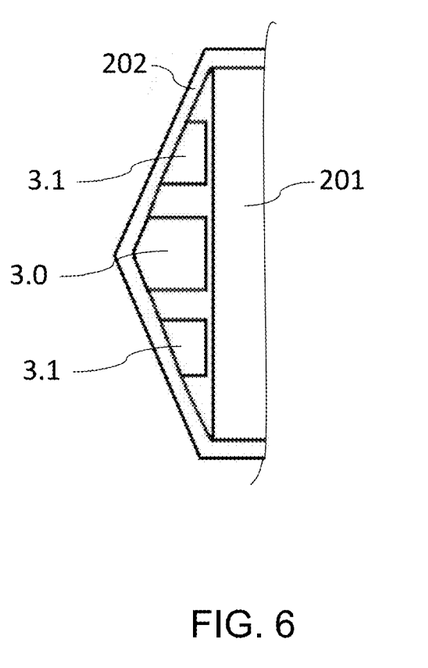
FIG. 6 shows a schematic and plan view of a separation assembly of the apparatus of FIG. 1 in the second position, where a solar panel is depicted with dashed lines and separated from a solar panel body by the action of the separation assembly.
Figure 7:
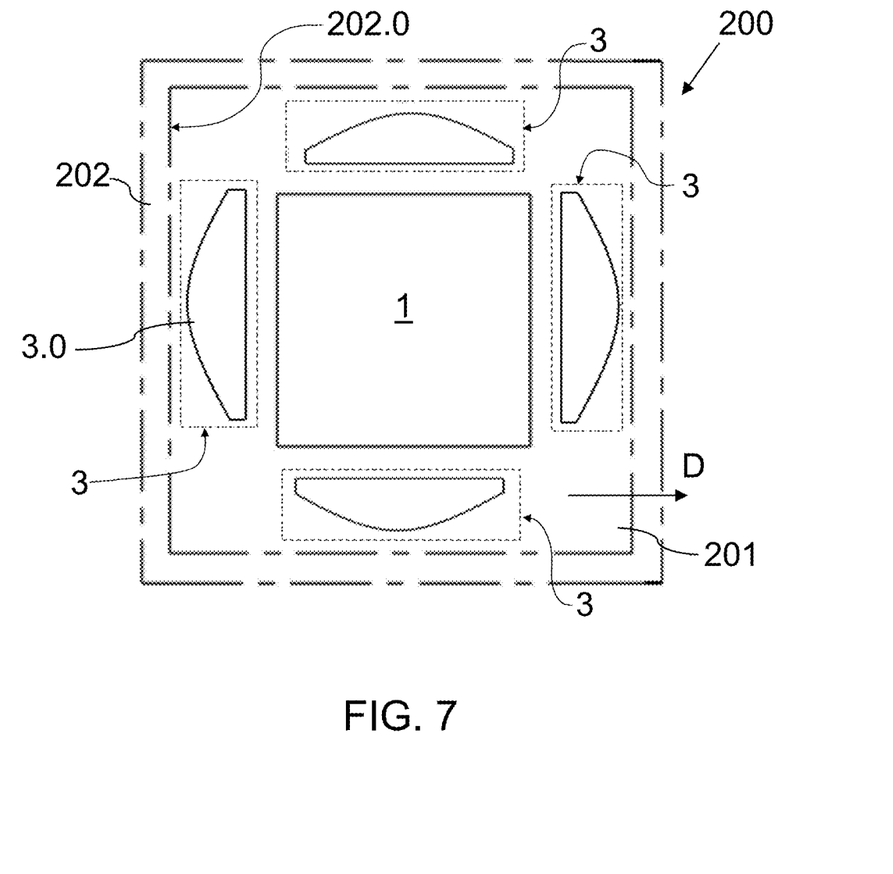
FIG. 7 illustrates separation elements comprising a semicircular profile.

In embodiments where the separation assembly 3 comprises a plurality of additional separation elements 3.1 at each side of the main separation element 3.0, an additional separation element 3.1 is further away from the frame 202 the further it is from the main separation element 3.0 (see FIGS. 4 to 6).

Preferably, when a separation assembly 3 comprises a plurality of separation elements 3.1, which may comprise one on each side of the main separation element 3.0, said additional separation elements 3.1 are symmetrically distributed with respect to said main separation element 3.0.

The additional separation element 3.1 comprises a contact surface that contacts the frame 202 during the displacement of the separation assembly 3 between the first position and the second position, said contact surface comprising a profile non-parallel to the frame 202. This allows said additional separation element 3.1 to also progressively contact the frame 202, as already described for the main separation element 3.0. Preferably, the profiles of all the separation elements 3.0 and 3.1 are configured so that the separation assembly 3 comprises a V-shape, as shown in FIGS. 4 to 6, the apex of said V-shape being the point of said profile closest to the frame 202 with the separation assembly 3 in the first position.

Preferably the apparatus 100 comprises at least one separation assembly 3 for each side of the frame 202, and an actuator 4 associated with each separation assembly 3. Thus, for disassembling the frame 202 of a conventional four-sided solar panel 200 the apparatus 100 comprises four separation assemblies 3: a first separation assembly 3 configured to move in a first direction between its first position and its second position; a second separation assembly 3 configured to move in a second direction transverse to the first direction, between its first position and its second position; a third separation assembly 3 configured to move in a third direction opposite to the first direction, between its first position and its second position; and a fourth separation assembly 3 configured to move in a fourth direction opposite to the second direction, between its first position and its second position.

In such cases, the apparatus 100 may comprise a control unit (not shown) to cause all separation assemblies 3 to be moved simultaneously from the first position to the second position, to separate the entire frame 202 from the body 201 simultaneously or as quickly as possible, to speed up the disassembling process.

Another aspect of the invention relates to a method of disassembling solar panel frames. The method comprises clamping a body 201 of a solar panel 200 whose frame 202 is to be disassembled between a positioning plate 1 and a contact plate 2, and displacing at least one separation assembly 3 between a first position inside the frame 202 and a second position outside said frame 202, such that the separation assembly 3 pushes said frame 202 during said displacement (the corresponding frame side). During the displacement of the separation assembly 3 between the first position and the second position, said separation assembly 3 is caused to progressively contact said frame 202.

The method is configured to be implemented in an apparatus 100 as described, said method being adapted to the corresponding configuration and/or embodiment of said apparatus 100. Thus, what is discussed for the apparatus 100 is also applicable to the method where applicable and is not repeated.

Additional embodiments are disclosed in the clauses that follow.

Clause 1. Solar panel frame disassembling apparatus comprising a body (201) surrounded by a frame (202), said apparatus (100) being configured to separate the frame (202) from the body (201) of the solar panel (200) and said apparatus (100) comprising a positioning plate (1) and a contact plate (2) configured to clamp the body (201) of a solar panel (200) arranged between said plates (1, 2); and a separation assembly (3) configured to be arranged over said body (201) or under said body (201) and facing the frame (202) at least when said body (1) is clamped between the positioning plate (1) and the contact plate (2), said separation assembly (3) being movable between a first position inside said frame (202) and a second position outside said frame (202) such that said separation assembly (3) pushes by contact said frame (202) during said displacement, said separation assembly (3) being configured to progressively contact said frame (202) during its displacement from the first position to the second position.

Clause 2. Solar panel frame disassembling apparatus according to clause 1, wherein the body (201) of the solar panel (200) comprises a first outer surface (201.1), and a second outer surface (201.2) configured to be exposed to the sun's rays and opposite to the first outer surface (201.1), the separation assembly (3) being configured to move parallel to said first outer surface (201.1).

Clause 3. Solar panel frame disassembling apparatus according to clause 1 or 2, wherein the separation assembly (3) comprises a main separation element (3.0) with a contact surface facing the frame (202) at least when the body (201) is clamped and when the separation assembly (3) is in the first position, said contact surface being configured to contact said frame (202) during the displacement of the separation assembly (3) from the first position to the second position and said contact surface comprising a profile non-parallel to said frame (202).

Clause 4. Solar panel frame disassembly apparatus according to clause 3, wherein the profile of the contact surface of the main separation element (3.0) is symmetrical with respect to a central point of said contact surface, said central point being the point of said contact surface closest to the frame (202) with the body (202) clamped between the positioning plate (1) and the contact plate (2) and with the separation assembly (3) in the first position, said profile preferably comprising a V-shape or a semi-circular shape.

Clause 5. Solar panel frame disassembling apparatus according to any of clauses 2 to 4, wherein the separation assembly (3) comprises at least one additional separation element (3.1) at one side of the main separation element (3.0) and spaced from said main separation element (3.0), said additional separation element (3.1) being configured to contact the frame (202), and push said frame (202), during displacement of the separation assembly (3) between the first position within the frame (202) and the second position.

Clause 6. Solar panel frame disassembling apparatus according to any of clauses 2 to 5, wherein the separation assembly (3) comprises at least one additional separation element (3.1) at each side of the main separation element (3.0) and spaced from said main separation element (3.0), the additional separation elements (3.1) being configured to contact the frame (202), and push said frame (202), during displacement of the separation assembly (3) between the first position within the frame (202) and the second position.

Clause 7. Solar panel frame disassembling apparatus according to clause 5 or 6, wherein the additional separation element (3.1) is further away from the frame (202) than the main separation element (3.0) when the separation assembly (3) is in the first position, all separation elements (3.0, 3.1) of the separation assembly (3) being configured to move simultaneously during movement of said separation assembly (3) between the first position to the second position.

Clause 8. Solar panel frame disassembling apparatus according to clause, comprising an actuator (4) configured to cause the joint displacement of all separation elements (3.0, 3.1) of the separation assembly (3) during the displacement of said separation assembly (3) between the first position and the second position.

Clause 9. Solar panel frame disassembling apparatus according to clause 8, comprising a bracket (5) to which all of the separation elements (3.0, 3.1) of the separation assembly (3) are attached, the actuator (4) being configured to cause displacement of said bracket (5) to cause displacement of the separation assembly (3) between the first position and the second position.

Clause 10. Solar panel frame disassembling apparatus according to any of clauses 7 to 9, wherein the separation assembly (3) comprises a plurality of additional separation elements (3.1) at each side of the main separation element (3.0), an additional separation element (3.1) being further away from the frame (202) the further it is from the main separation element (3.0).

Clause 11. Solar panel frame disassembling apparatus according to any of clauses 6 to 10, wherein the additional separation element (3.1) comprises a contact surface that contacts the frame (202) during displacement of the separation assembly (3) between the first position and the second position, said contact surface comprising a profile non-parallel to the frame (202).

Clause 12. Solar panel frame disassembling apparatus according to any of clauses 1 to 11, wherein the frame (202) comprises a plurality of sides, the apparatus (100) comprising a separation assembly (3) for each of the sides of the frame (202) of the solar panel (200), and an actuator (4) associated with each separation assembly (3), an actuator (4) being configured to cause displacement of its associated separation assembly (3).

Clause 13. Solar panel frame disassembling apparatus according to clause 12, comprising a first separation assembly (3) configured to move in a first direction between its first position and its second position; a second separation assembly (3) configured to move in a second direction transverse to the first direction, between its first position and its second position: a third separation assembly (3) configured to move in a third direction opposite the first direction, between its first position and its second position; and a fourth separation assembly (3) configured to move in a fourth direction opposite the second direction, between its first position and its second position.

Clause 14. Solar panel frame disassembling apparatus according to clause 12 or 13, comprising a control unit (6) communicated with the actuators (4) and configured to cause a simultaneous displacement of all separation assemblies (3).

Clause 15. Method of disassembling solar panel frames, comprising clamping between a positioning plate (1) and a contact plate (2) a body (201) of a solar panel (200) further comprising a frame (202) surrounding the body (201); and displacing at least one separation assembly (3) between a first position inside the frame (202) and a second position outside said frame (202), such that the separation assembly (3) pushes said frame (202) during said displacement, during the displacement of the separation assembly (3) between the first position and the second position said separation assembly (3) is caused to progressively contact the frame (202).

The invention claimed is:

1. An apparatus for disassembling a frame from a body of a solar panel, the apparatus comprising:
    first and second contact plates that are configured to clamp the body between them;
    a separation assembly configured to be arranged over or under the body, the separation assembly including:
    a first separation element having a first contact surface that is configured to face an internal surface of a first side of the frame, the first separation element being moveable between a first position in which the first contact surface does not push on the internal surface of the frame and a second position in which the first contact surface pushes on the internal surface of the frame to cause at least a portion of the frame to be separated from the body, the first contact surface having a first profile non-parallel to the first side of the frame, the first profile being symmetrical with respect to a central point of the first contact surface, the central point being a point of the first contact surface closest to the first side of the frame, the first contact surface being configured to progressively contact the first internal surface of the first side of the frame upon the first separation element moving from the first position to the second position; and
    second and third separation elements respectively located on first and second opposite sides of the first separation element with each being spaced apart from the first separation element, the second separation element having a second contact surface that is configured to push against the internal surface of the first side of the frame during a time of the first separation element moving from the first position to the second position, the third separation element having a third contact surface that is configured to push against the internal surface of the first side of the frame during the time of the first separation element moving from the first position to the second position, the first separation element being located nearer the first side of the frame than each of the second and third separation elements when the first separation element is in the first position.

2. The apparatus according claim 1, wherein the first profile comprises a semi-circular shape.

3. The apparatus according claim 1, wherein the first profile comprises a V-shape.

4. The apparatus according to claim 1, wherein the first separation element is configured to move parallel to an outer surface of the body of the solar panel.

5. The apparatus according to claim 1, wherein the second and third separation elements are symmetrically located with respect to the first separation element.

6. The apparatus according to claim 1, wherein the first, second and third separation elements do not move relative to one another.

7. The apparatus according to claim 1, wherein the first, second and third separation elements are configured to move simultaneously during a time of the first separation element moving from the first position to the second position.

8. The apparatus according to claim 1, wherein the second contact surface has a second profile different than the first profile, the second profile being non-parallel to the first side of the frame, the third contact surface having a third profile different than the first profile, the third profile being non-parallel to the first side of the frame.

9. The apparatus according to claim 1, further comprising a bracket to which the first separation element is attached, the apparatus further including an actuator coupled to the bracket and configured to cause a movement of the bracket to cause the movement of the first separation element between the first position and the second position.

10. An apparatus for disassembling a frame from a body of a solar panel, the apparatus comprising:
    first and second contact plates that are configured to clamp the body between them;
    a separation assembly configured to be arranged over or under the body, the separation assembly including:
    a first separation element having a first contact surface that is configured to face an internal surface of a first side of the frame, the first separation element being moveable between a first position in which the first contact surface does not push on the internal surface of the frame and a second position in which the first contact surface pushes on the internal surface of the frame to cause at least a portion of the frame to be separated from the body, the first contact surface having a first profile non-parallel to the first side of the frame, the first profile being symmetrical with respect to a central point of the first contact surface, the central point being a point of the first contact surface closest to the first side of the frame, the first contact surface being configured to progressively contact the first internal surface of the first side of the frame upon the first separation element moving from the first position to the second position; and a second separation element located on a first side of the first separation element and spaced apart from the first separation element, the second separation element having a second contact surface that is configured to push against the internal surface of the first side of the frame during a time of the first separation element moving from the first position to the second position, the first separation element being located nearer the first side of the frame than the second separation element when the first separation element is in the first position.

11. The apparatus according to claim 10, wherein the first and second separation elements are configured to move simultaneously during a time of the first separation element moving from the first position to the second position.

12. The apparatus according to claim 10, wherein the second contact surface has a second profile different than the first profile, the second profile being non-parallel to the first side of the frame.

13. An apparatus for disassembling a frame from a body of a solar panel, the apparatus comprising:

first and second contact plates that are configured to clamp the body between them;

a separation assembly configured to be arranged over or under the body, the separation assembly including:

a first separation element having a first contact surface that is configured to face an internal surface of a first side of the frame, the first separation element being moveable between a first position in which the first contact surface does not push on the internal surface of the frame and a second position in which the first contact surface pushes on the internal surface of the frame to cause at least a portion of the frame to be separated from the body, the first contact surface having a first profile non-parallel to the first side of the frame, the first profile being symmetrical with respect to a central point of the first contact surface, the central point being a point of the first contact surface closest to the first side of the frame, the first contact surface being configured to progressively contact the first internal surface of the first side of the frame upon the first separation element moving from the first position to the second position; and second and third separation elements respectively located on first and second opposite sides of the first separation element with each being spaced apart from the first separation element, the second separation element having a second contact surface that is configured to push against the internal surface of the first side of the frame during a time of the first separation element moving from the first position to the second position, the third separation element having a third contact surface that is configured to push against the internal surface of the first side of the frame during the time of the first separation element moving from the first position to the second position, wherein the first, second and third separation elements do not move relative to one another.

\* \* \* \* \*